3,472,659
PROCESS FOR PREPARING CONDENSED MILK OF IMPROVED STORAGE CHARACTERISTICS
Girish Prasad Mathur and Sudhakar Pundlik Shanbhag, Bombay, India, assignors to Lever Brothers Company, New York, N.Y., a corporation of Maine
No Drawing. Filed Aug. 19, 1966, Ser. No. 573,473
Claims priority, application Great Britain, Sept. 2, 1965, 37,483/65
Int. Cl. A23c 9/00, 1/00
U.S. Cl. 99—55                                   3 Claims

ABSTRACT OF THE DISCLOSURE

The thickening or gelling of condensed milk which occurs during storage may be prevented by addition of a small quantity of acid-precipitated casein to the milk before or during evaporative concentration.

---

This invention relates to milk and in particular to condensed milk and to products containing condensed milk.

Milk may be preserved by sterilisation, for example, by the application of heat or by concentrating it, optionally in the presence of added sugar, or by application of both concentration and sterilisation treatments. Concentrated milk is known as condensed milk. It is desirable that condensed milk should not deteriorate during storage, that it should retain free flowing characteristics and that it should be capable of reconstitution with water to a product substantially indistinguishable from fresh milk.

The concentration and/or sterilisation treatments used in the manufacture of condensed milk are well known, and are usually sufficient to suppress the growth of spoilage micro-organisms. However, physico-chemical changes which may result in the deterioration of the product sometimes occur. One such change is thickening and gel formation during storage. For example, condensed milk may become semi-solid and completely lose its free flow characteristics when held at ambient temperature for fairly long periods. This tendency for condensed milk to gel may be reduced or even prevented by the addition of citrate and/or polyphosphate; these substances are not universally accepted as food additives, however, and therefore an alternative method not involving the addition of these substances for preventing gel formation is preferably employed.

It has now been discovered that thickening may be minimized and the tendency to gel formation reduced by the addition to milk of acid casein. The mixture of milk and acid casein is then usually pre-heated, concentrated optionally in the presence of added sugar, cooled and packaged according to known procedures.

Accordingly the invention provides a process for the preparation of condensed milk, which comprises the step of mixing acid casein and milk, and concentrating the mixture so obtained.

The following definitions are applicable in this specification:

'condensed milk' is milk (whole or skim) from which water has been evaporated and to which sugar may or may not have been added.
'skim milk' is whole milk from which cream has been separated.
'acid casein' is casein precipitated from whole or skim milk by treating the milk with an acid.

Acid casein is conveniently prepared by adding an acid to milk sufficient to adjust the pH to the iso-electric point of casein, and then filtering the casein precipitate from the acid whey. The casein so pecipitated should preferably be washed with water until the protein is free of acid.

Any suitable acid may be used to precipitate the casein. The preferred acid is a mineral acid, for example, hydrochloric acid, but an organic acid, for example, lactic acid, is also suitable.

In the manufacture of condensed milk according to the invention, it is convenient to divide the milk to be condensed into two portions. One portion is treated to separate acid casein, the acid whey and washings being discarded for the purpose of the present invention. The acid casein so obtained may then be mixed with the second portion of the milk and the mixture further treated to convert it into condensed milk. Alternatively, the acid casein may be mixed with the second portion of milk during the concentration process. Preferably the acid casein and milk are thoroughly mixed by homogenisation in, for example, a colloid mill, a high pressure homogeniser, or a sonic homogeniser.

The relative proportion by weight of 'acid casein' milk (that is, the milk from which the acid casein is obtained) to 'fresh' milk (that is the milk to which the acid casein is added), is suitably between 1:6 and 1:20; the preferred ratio depends on the composition and type of milk used. Thus for cow's milk the preferred ratio is between 1:9 and 1:12, while for buffalo milk the preferred ratio is between 1:8 and 1:10.

The invention may also be applied to the preparation of liquid or semi-liquid food products which contain milk in concentrated form. Examples of such products are sauces and dressings.

The following examples are included to illustrate the invention.

EXAMPLE 1

This example describes the preparation of sweetened condensed skim buffalo milk. For the sake of completeness the whole process is described.

Preparation of skim milk

Whole buffalo milk (3,620 kg.), obtained 7 to 8 hours after milking, was heated to 40° to 45° C. and the cream separated by passing the milk through a cream separator. The skim milk (3,154 kg.) so obtained was divided into two parts in the ratio of 10:1.

Preparation of acid casein

The smaller portion of skim milk (286 kg.) was treated with hydrochloric acid (2.16 kg.) diluted with water (2.16 kg.) so as to adjust the pH to about 4.6 and, after stirring, allowed to stand at room temperature for about 15 minutes. The precipitated acid casein (26.8 kg.) was washed with water (315 kg.) until free from acid.

Homogenising casein with milk

The washed acid casein was made into a paste with water and then mixed with a small amount of skim milk (300 ml.) and homogenised twice in a Minisonic homogeniser. The homogenate was mixed with the remaining bulk of skim milk and homogenised twice by passing through the Minisonic homogeniser.

Forewarming

The homogenised milk (2,892 kg.) was heated to 85° C. for 10 minutes in an open pan steam kettle.

Evaporation

The milk was concentrated by evaporating under reduced pressure in a cyclone evaporator at a temperature of 42° to 48° C. During evaporation, sugar syrup (450 kg. sugar in 300 kg. water) was added and the process of evaporation stopped when the milk had reached a total solids content of 70–72%.

Cooling and forced crystallisation

Condensed skim milk was transferred from the cyclone evaporator to a scraped surface heat exchanger and stirred slowly. The condensed milk cooled to 30° C. in about 10 minutes and the stirring was continued for a further 20 minutes. When the temperature had reached 22° C., lactose seed, 1.0 kg. was added and stirring continued for a further 60 minutes at 20° C. The product (1,000 kg.) was finally canned.

The sweetened condensed milk so obtained reconstituted well in 2 parts of water to a white product with smooth texture and an excellent milky flavour.

EXAMPLE 2

This example describes the preparation of evaporated skim milk from buffalo milk. For the sake of completeness the whole process is described.

Preparation of skim milk

Whole buffalo milk (3,620 gk.) was heated to 40° to 50° C. and the cream separated by passing through a cream separator. The skim milk (3,154 kg.) so obtained was divided into two parts in the ratio 10:1.

Preparation of acid casein

The smaller potrion of skim milk (286 kg.) was treated with hydrochloric acid (2.16 kg.) diluted with water (2.16 kg.) so as to adjust the pH to about 4.6 and after stirring, allowed to stand at room temperature for about 15 minutes. The precipitated acid casein (26.8 kg.) was washed with water (315 kg.) until free from acid.

Homogenising casein

The washed acid casein was made into a paste with water and then mixed with a small amount of skim milk (300 kg. and homogenised twice in a sonic homogenizer. The homogenate was mixed with remaining bulk of skim milk and homogenized twice by passing through the homogenizer.

Forewarming

The homogenized milk (2,892.44 kg.) was heated to 85° C. for 10 minutes in a steam kettle.

Evaporation

The milk was concentrated by evaporating under reduced pressure in a vacuum pan. The evaporation was stopped when the milk had reached total solids content of 24–28%.

Homogenizing

The evaporated milk from the evaporators was homogenized by passing through a high pressure homogenizer.

Cooling and sterilizing

Homogenized milk was transferred to a scrape surface heat exchanger and cooled by stirring slowly to 15° C. and maintained at this temperature for 30 minutes. The product (1,000 kg.) was then packed at 10° to 15° C. in cans and hermetically sealed. The filled tins, under a state of continued agitation, were sterilized in a batch type sterilizer by heating for 20 minutes at 116° C. Immediately after the holding time, the evaporated milk was cooled by cold water and the tins agitated until the temperature reached 20° to 25° C. (within 15 minutes).

The evaporated milk as obtained had a smooth texture and reconstituted readily in 2 parts of water and had an excellent milky flavour.

EXAMPLE 3

This example describes the preparation of sweetened condensed skim cow milk. For the sake of completeness the whole process is described.

Preparation of skim milk

Whole cow milk (3,510 kg.) obtained 7 to 8 hours after milking was heated ot 40° to 45° C. and the cream separated by passing the milk through a cream separator. The skim milk (3,150 kg.) so obtained was divided into two parts in the ratio of 20:1.

Preparation of acid casein

The smaller portion of skim milk (150 kg.) was treated with hydrochloric acid (1.14 kg.) diluted with water (1.14 kg.) so as to adjust the pH to about 4.6 and after stirring, allowed to stand at room temperature for about 15 minutes. The precipitated acid casein (14.075 kg.) was washed with water (315 kg.) until free from acid.

Homogenizing casein with milk

The washed acid casein was made into a paste with water and then mixed with a small amount of skim milk (300 kg.) and homogenized twice in a sonic homogenizer. The homogenate was mixed with the remaining bulk of skim milk and homogenized twice by passing through the homogenizer.

Forewarming

The homogenized milk (3,012.84) was heated to 85° for 10 minutes in an open pan steam kettle.

Evaporation

The milk was concentrated by evaporating under reduced pressure in an evaporator at a temperature of 42° to 48° C. During evaporation, sugar syrup (450 kg. sugar in 300 kg. water) was added and the process of evaporation stopped when the milk had reached a total solids content of 70–72%.

Cooling and forced crystallisation

Condensed skim milk was transferred from the evaporator to a scraped surface heat exchanger and stirred slowly. The condensed milk cooled to 30° C. in about 10 minutes and the stirring was continued for a further 20 minutes. When the temperature had reached 22° C., lactose seed, 1.0 kg. was added and stirring continued for a further 60 minutes at 20° C. The produce (1,000 kg.) was finally canned.

The sweetened condensed milk so obtained reconstituted well in 2 parts of water to a white product with smooth texture and an excellent milky flavour.

What is claimed is:

1. A process for the preparation of condensed milk, which comprises the steps of:
   (1) precipitating acid casein from a first portion of uncondensed milk by addition of acid to the milk,
   (2) separating the precipitated acid casein from residual liquor,
   (3) adding the separated acid casein to a second portion of uncondensed milk, and
   (4) concentrating this second portion of milk, the addition of said separated acid casein to said second portion of milk being made before or during concentration of the second portion, and the volume of the second portion of uncondensed milk being at least 6 times and not more than 20 times the volume of the first portion of uncondensed milk, whereby the condensed milk does not thicken or gel during storage.

2. A process according to claim 1, in which the milk is cow's milk, the volume of the second portion of uncondensed cow's milk being at elast 9 times and not more than 12 times the volume of the first portion of uncondensed cow's milk.

3. A process according to claim 1, in which the milk is buffalo milk, the volume of the second portion of uncondensed buffalo milk being at least 8 times and not more than 10 times the volume of the first portion of uncondensed buffalo milk.

(References on following page)

References Cited

UNITED STATES PATENTS 3,074,796   1/1963   Peebles et al. -------- 99—55

OTHER REFERENCES

Hunziker, O. F., Condensed Milk and Milk Powder, publ. by the author, La Grange, Ill., 1949, (pp. 2 and 339).

LIONEL M. SHAPIRO, Primary Examiner

D. M. NAFF, Assistant Examiner

U.S. Cl. X.R.

99—151, 200, 212